United States Patent

Staerzl

[11] Patent Number: 6,067,847
[45] Date of Patent: May 30, 2000

[54] RUNNING QUALITY EVALUATOR FOR AN INTERNAL COMBUSTION ENGINE

[75] Inventor: Richard E. Staerzl, Fond du Lac, Wis.

[73] Assignee: Brunswick Corporation, Lake Forest, Ill.

[21] Appl. No.: 08/960,545

[22] Filed: Oct. 31, 1997

[51] Int. Cl.[7] .................................................. G01M 15/00
[52] U.S. Cl. ........................................... 73/117.3; 73/112
[58] Field of Search ............................... 73/117.3, 35.01, 73/112, 113, 116, 117.2

[56] References Cited

U.S. PATENT DOCUMENTS

| | | | |
|---|---|---|---|
| 4,932,379 | 6/1990 | Tang et al. | 73/117.3 |
| 5,425,269 | 6/1995 | Bradshaw | 73/117.3 |
| 5,529,041 | 6/1996 | Andrews | 73/117.3 |
| 5,711,272 | 1/1998 | Maegawa et al. | 73/116 |

*Primary Examiner*—Eric S. McCall
*Attorney, Agent, or Firm*—Andrus, Sceales, Starke & Sawall

[57] ABSTRACT

A running quality evaluator for an internal combustion engine for optimizing the running quality of the engine. The running quality evaluator includes an engine speed circuit which conditions a series of trigger pulses from the engine. The conditioned trigger pulses from the engine speed circuit are converted by an integrating circuit into an engine speed signal. The engine speed signal increases as the frequency of the trigger pulses from the internal combustion engine increase. Thus, the engine speed signal changes as the frequency of the trigger pulses from the engine change. The engine speed signal from the integrating circuit is then converted into an engine quality signal by a differentiating circuit. The engine quality signal increases as the rate of change of the engine speed signal increases. The engine quality signal from the differentiating circuit is then integrated into an output signal by an output circuit. The output signal increases as the rate and magnitude of the engine quality signal increases. The output signal is visually displayed by a visual output device, such that an increasing value of the output signal is indicative of deteriorating engine quality performance. To increase engine performance, a user or technician can adjust engine operating parameters, such as spark timing, to minimize the output signal displayed by the visual output device.

16 Claims, 1 Drawing Sheet

RUNNING QUALITY EVALUATOR FOR AN INTERNAL COMBUSTION ENGINE

BACKGROUND OF THE INVENTION

The invention relates to the operation of an internal combustion engine. More specifically, the invention is a method and device for evaluating and quantifying the running quality of an internal combustion engine in a marine propulsion system such that the running quality of the engine may be optimized.

When initially manufacturing and later operating an internal combustion engine, one important design characteristic which must be optimized in order for the engine to operate smoothly is the timing of the spark plug ignition as related to the position of the piston in the engine cylinder relative to top-dead center. When the engine is properly tuned, the spark ignition in the engine cylinder produces an optimal explosion that results in the engine operating in a very smooth manner at idle speeds. If the spark timing is a few degrees off relative to top dead-center, the internal combustion engine will run rougher, meaning that at idle, the engine speed tends to fluctuate resulting in uneven performance.

Presently, the running quality of an internal combustion engine is determined and set by a technician who physically listens to the audible changes in the engine performance and watches for vibration in the engine at idle. The trained technician adjusts the spark timing until the engine sounds and looks like it is running more smoothly. While this type of engine tuning has proven effective, especially for a technician having many years of experience, it is an imprecise method that is difficult to teach and duplicate.

Therefore, it can be appreciated that a device which quantifies the running quality of an engine and outputs a signal which can be read and optimized would be a desirable innovation in the internal combustion engine field, particularly the marine propulsion field.

BRIEF SUMMARY OF THE INVENTION

The present invention is a running quality evaluator for quantifying the quality of operation of an internal combustion engine. In a particularly desirable implementation, the invention is a running quality evaluator for use on a two or four-stroke marine engine that provides a visual output related to the relative operating condition of the internal combustion engine. The running quality evaluator of the present invention includes an engine speed circuit which is connected to the internal combustion engine. The engine speed circuit receives a series of trigger pulses from the internal combustion engine and conditions the series of trigger pulses. The conditioned series of trigger pulses from the engine speed circuit are at a frequency corresponding to the engine speed and have a constant pulse width.

The conditioned trigger pulses from the engine speed circuit are integrated by an integrating circuit to generate an engine speed signal. Since the conditioned trigger pulses are integrated, the resulting engine speed signal increases as the frequency of the conditioned trigger pulses increases. If the frequency of the trigger pulses decreases, the engine speed signal will also decrease.

The engine speed signal from the integrating circuit is coupled to a differentiating circuit. The differentiating circuit produces an engine quality signal based on the rate at which the engine speed signal changes. Since the differentiating circuit differentiates the engine speed signal to produce the engine quality signal, the engine quality signal increases as the rate of change of the engine speed signal increases. Thus, if the engine speed signal is relatively constant, the engine quality signal will be very low.

Finally, the engine quality signal from the differentiating circuit is coupled to an output circuit which integrates the engine quality signal to produce an output signal. Since the engine quality signal typically includes spikes and irregular wave-forms, the output circuit integrates or sums the engine quality signal to produce a relatively stable output signal. The output signal is a summation of the engine quality signal, such that the larger the output signal, the worse the engine is operating. By monitoring the output signal, the performance of the internal combustion engine can be optimized by adjusting the spark timing until the output signal is reduced as low as possible. In this regard, a visual output device displays the output signal such that it can be readily monitored during tuning of the engine.

In the preferred embodiment of the invention, the differentiating circuit includes a pair of separate circuits, an accelerating circuit and a decelerating circuit, one of which differentiates the engine speed signal based on whether the engine speed signal is increasing or decreasing. In this manner, the differentiating circuit generates a single engine quality signal regardless of whether the engine speed signal is increasing or decreasing.

Other objects and advantages of the invention will appear in the course of the following description.

BRIEF DESCRIPTION OF THE DRAWING

The drawing illustrates the best mode presently contemplated of carrying out the invention.

DETAILED DESCRIPTION OF THE INVENTION

Figure 1:
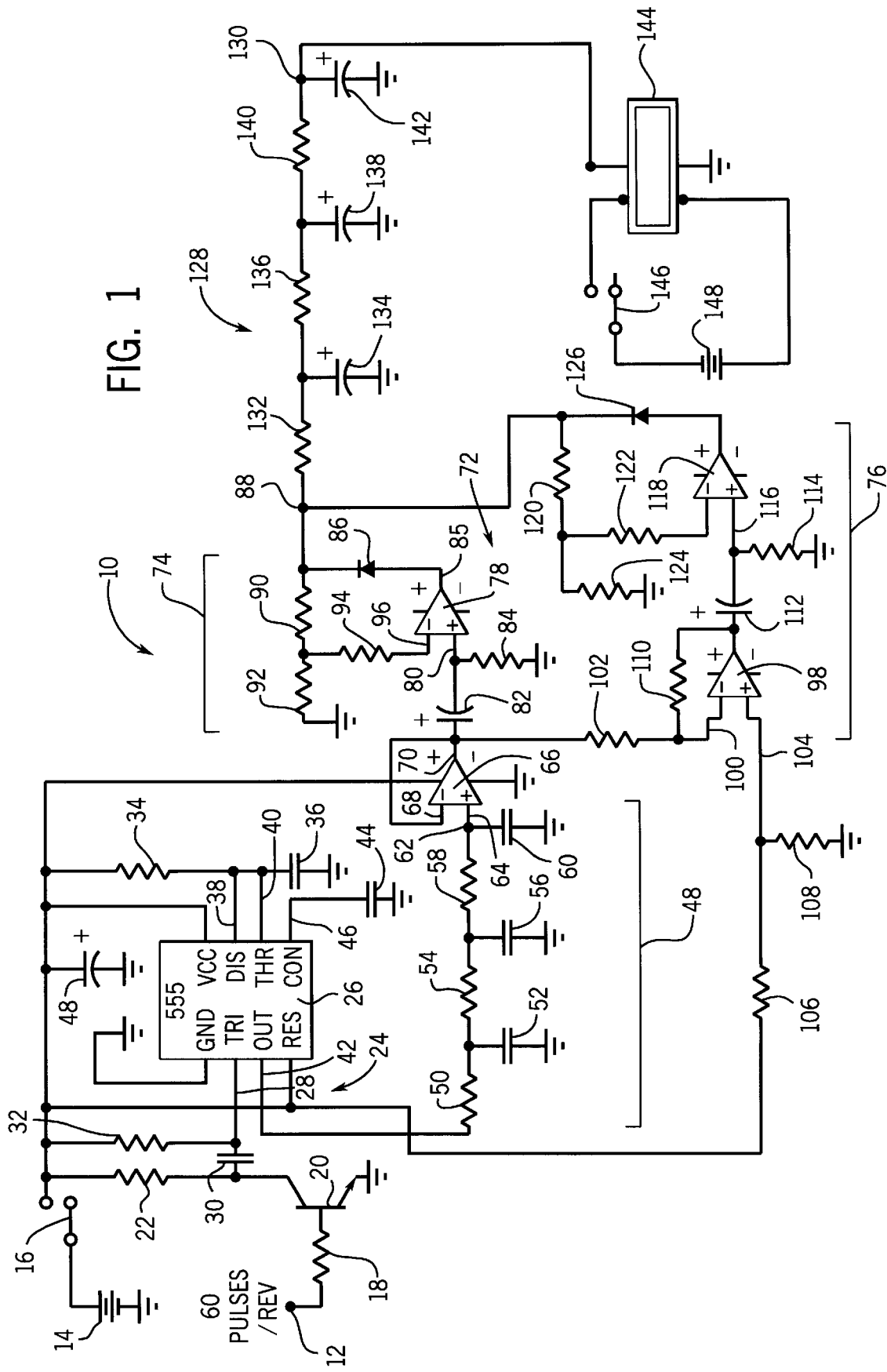
FIG. 1 is a detailed circuit diagram showing the running quality evaluator of the present invention as connected to an internal combustion engine.

Referring to FIG. 1, thereshown is the detailed circuit diagram of the running quality evaluator of the invention, generally referred to by reference numeral 10. The running quality evaluator 10 functions to provide a quantifiable measurement relating to the running quality of an internal combustion engine (not shown) such that various running characteristics of the internal combustion engine can be optimized. In the preferred embodiment of the invention, the running quality evaluator 10 is a hand-held device that can be connected to the engine to monitor the running quality, as will be discussed below.

The running quality evaluator 10 is shown connected at node 12 to the tachometer (not shown) of the boat or vehicle in which the internal combustion engine is mounted. In the preferred embodiment of the invention, the tachometer in the boat that is connected to node 12 generates 60 trigger pulses for each revolution of the propeller shaft connected to the internal combustion engine. In other embodiments of the invention, the tachometer connected to node 12 could output a different number of pulses per revolution, or even one pulse per revolution, without affecting the general operation of the running quality evaluator 10, as will be discussed below. Additionally, node 12 could be connected directly to the spark plug lead of the internal combustion engine. However, the tachometer is preferred over the spark plug lead since the tachometer provides a cleaner signal.

The running quality evaluator 10 is connected to a power supply 14 through a switch 16 to provide electrical power for the remaining components of the running quality evaluator 10. In the preferred embodiment of the invention, the power supply 14 is a 9-volt battery.

The series of trigger pulses from the tachometer at node 12 are fed through resistor 18 to the base of transistor 20. The collector of transistor 20 is connected to the power supply 14 through a resistor 22. Resistor 22 is a load resistor for transistor 20 such that DC current can flow from power supply 14 to the transistor 20 through the resistor 22. As trigger pulses from the tachometer are received at node 12, the high value of each trigger pulse applied to the base of transistor 20 turns transistor 20 on for the duration of the trigger pulse, thereby allowing current to flow from power supply 14 through resistor 22 and transistor 20.

The trigger pulses from the tachometer connected to node 12 are relatively unstable and vary with the speed of the engine. Thus, an engine speed circuit 24 is connected to the collector of transistor 20 to condition the series of trigger pulses from the engine, such that the trigger pulses can be more readily processed in the remaining components of the running quality evaluator 10. The engine speed circuit 24 includes a timer 26 which functions to provide a series of conditioned trigger pulses each having a constant duration or pulse width. The conditioned trigger pulses from timer 26 correspond in frequency to the frequency of the trigger pulses from the engine tachometer at node 12. Thus, the engine speed circuit 24 outputs a series of conditioned trigger pulses that have the same frequency as the trigger pulses from the tachometer. The conditioned trigger pulses, however, each have a constant duration, unlike the trigger pulses directly from the engine at node 12. The timer 26 is a commercially available component, such as Model No. LM555 sold by National Semiconductor. The factory designated pin designations for the timer 26 of the preferred embodiment are shown in FIG. 1 to further facilitate understanding of the invention.

The trigger input 28 of the timer 26 is coupled to the collector of transistor 20 through a capacitor 30. Capacitor 30 acts to block the DC component of the signal at the collector of transistor 20 from reaching the timer 26. As the transistor 20 is turned "on" by the trigger pulses applied to the base from node 12, the capacitor 30 provides a path to ground from the trigger input 28 through the transistor 20. The transistor 20 provides a path to ground each time a trigger pulse is present at the base, such that the the frequency at which the transistor 20 is turned on by the trigger pulses at node 12 is relayed to the trigger input 28. In this manner, the frequency of the trigger pulses at node 12 are relayed to the timer 26 at the trigger input pin 28. Resistor 32 is connected between the power supply 14 and the trigger pin 28 to pull up the trigger pin 28 to a high value when a trigger pulse is not present at node 12.

Resistor 34 and capacitor 36 are connected to discharge pin 38 and threshold pin 40 of the timer 26 to set the pulse width of each conditioned trigger pulse at output pin 42 of timer 26 in a conventional manner. In the preferred embodiment of the invention, resistor 34 and capacitor 36 are selected such that the conditioned pulse width of each trigger pulse at pin 42 is approximately 20 micro seconds wide. A capacitor 44 is connected to pin 46 on the timer 26 and acts as a noise filter for the timer 26. Capacitor 48 is connected to the power supply 14 and acts as a filter capacitor for the power supply. Capacitor 48 acts to keep transient signals from the power supply 14 from interfering with the timing of the timer 26.

The series of conditioned trigger pulses, each having a specified pulse width, generated by the engine speed circuit 24 and present at output pin 42 of timer 26 is fed into an integrating circuit 48. The integrating circuit 48 generally converts the conditioned series of trigger pulses into an engine speed signal that increases in value as the frequency of the trigger pulses increases. In the preferred embodiment of the invention, the engine speed signal is a DC voltage that increases in value as the engine speed increases. As shown in FIG. 1, the integrating circuit 48 is a three-node filter comprised of resistor 50, capacitor 52, resistor 54, capacitor 56, resistor 58, and capacitor 60. The three-node filter including resistors 50, 54, and 58 and capacitors 52, 56 and 60 is a common circuit configuration, the detailed discussion of which will be omitted. The three-node filter of the integrating circuit 48 functions such that as the frequency of the conditioned trigger pulses at output pin 42 of timer 26 increases, the engine speed signal represented by the voltage across capacitor 60 also increases. If the internal combustion engine is operating roughly, the frequency of the trigger pulses at node 12, and therefore the frequency of the conditioned trigger pulses at output pin 42, will fluctuate due to the poor engine operation. Thus, the engine speed signal across capacitor 60 will also increase and decrease as the frequency of the trigger pulses fluctuate. The three-node filter of the integrating circuit 48 is selected to be a fast response integrator such that as the frequency of the conditioned trigger pulses changes, the fast response of the integrating circuit 48 allows the engine speed signal across capacitor 60 to change quickly.

The engine speed signal present at node 62 is connected to non-inverting terminal 64 of comparator 66. Inverting terminal 68 of the comparator 66 is connected to output 70 such that the comparator 66 is configured as a common buffer amplifier having a gain of 1. Thus, the engine speed signal present at the non-inverting terminal 64 is also present at the output 70 of the comparator 66. In this manner, the engine speed signal at node 62 is also present at the output 70 of comparator 66.

The engine speed signal present at output 70 is coupled to a differentiating circuit 72. The differentiating circuit 72 converts the fluctuating engine speed signal into an engine quality signal representing the running quality of the engine at a particular instant. Since the engine speed signal at node 62 and output 70 changes as the frequency of the trigger pulses change, an increase in the rate of change of the engine speed signal indicates that the internal combustion engine is running roughly. The differentiating circuit 72 generates an engine quality signal that is based on the current rate of change of the engine speed signal at output 70. Thus, the more rapidly the engine speed signal at output 70 changes, the higher the engine quality signal will be. Since the engine quality signal is based on the current rate of change of the engine speed signal, the engine quality signal can include a series of spikes representing relatively large changes in the engine speed signal.

The differentiating circuit 72 includes a pair of separate circuits, an acceleration circuit 74 and a deceleration circuit 76. The acceleration circuit 74 differentiates the engine speed signal when the engine speed signal is increasing, thereby indicating an increase in the frequency of the trigger pulses, signifying that the engine speed is accelerating. The deceleration circuit 76 differentiates the engine speed signal when the engine speed signal is decreasing, thereby indicating that the engine speed is decelerating.

The acceleration circuit 74 of the differentiating circuit 72 includes a comparator 78 having its non-inverting terminal 80 coupled to the output 70 of comparator 66 through capacitor 82 and resistor 84. The capacitor 82 and the resistor 84 are connected in a conventional manner such that the combination of the capacitor 82 and the resistor 84 differentiate the changing engine speed signal present at the output 70 of comparator 66. The combination of capacitor 82 and resistor 84 functions such that the more rapidly the engine speed signal at output 70 changes, the higher the voltage will be across resistor 84.

The voltage across resistor 84 is connected to the non-inverting terminal 80 of comparator 78. The output of comparator 78 is fed through diode 86 such that the engine quality signal is present at node 88. Since the diode 86 is connected in the feedback path of comparator 78, the diode 86 allows the output of comparator 78 present at node 88 to go high immediately, while preventing the output of comparator 78 from going low. Resistors 90, 92 and 94 in the feedback path of comparator 78 provide gain for the comparator 78 such that the voltage at the non-inverting terminal 80 is multiplied by the gain. In the preferred embodiment of the invention, the gain for comparator 78 is set at approximately 9.4 by the proper selection of the resistors 90, 92 and 94. Thus, the acceleration circuit 74 converts the engine speed signal at output 70 into an engine quality signal based on the rate on which the engine speed signal increases. The greater the rate of change of the engine speed signal, the larger the engine quality signal will be at node 88. As previously noted, the acceleration circuit 74 differentiates the engine speed signal, which often results in large spikes when the engine speed signal changes rapidly.

The second portion of the differentiating circuit 72 is deceleration circuit 76. The deceleration circuit 76 consists of a comparator 98 having its inverting terminal 100 coupled to the output 70 of comparator 66 through a resistor 102. The non-inverting terminal 104 of the comparator 98 is connected to the power supply 14 through a voltage divider provided by resistors 106 and resistor 108. Resistors 106 and 108 provide a positive reference voltage to the non-inverting terminal 104. Resistor 110 is placed in the feedback path of comparator 98 and is matched with resistor 102 such that comparator 98 is configured as an inverting amplifier with a gain of 1. Thus, the comparator 98 of the deceleration circuit 76 multiplies the engine speed signal by an −1, such that when the engine is decelerating, the decreasing voltage at the output 70 of comparator 66 is inverted by comparator 98.

The output of comparator 98, which is the inverted engine speed signal, is coupled to capacitor 112 and resistor 114. The combination of capacitor 112 and resistor 114 differentiates the inverted engine speed signal present at the output of amplifier 98 in a similar manner to the combination of capacitor 82 and resistor 84 in the acceleration circuit 74. Thus, the voltage across resistor 114 increases as the rate of change of the engine speed signal at output 70 of comparator 66 increases. Since resistor 114 is coupled to the output of comparator 98 in the deceleration circuit 76, the voltage across resistor 114 increases when the engine speed signal is decreasing.

The voltage across resistor 114 is fed into the non-inverting terminal 116 of comparator 118. Resistors 120, 122 and 124 are positioned in the feedback path of comparator 118 to provide the gain for comparator 118 in a known manner. In the preferred embodiment of the invention, the resistors 120, 122 and 124 in the feedback path of comparator 118 correspond in value to the resistors 90, 92 and 94 in the feedback path of comparator 78, such that the comparators 78 and 118 provide the same amount of gain (9.4). Diode 126 is also contained in the feedback path for comparator 118, such that comparator 118 is able to go high immediately, but is unable to output a low value due to the bias direction of diode 126.

The output of comparator 118 is connected to node 88 through diode 126 such that the engine quality signal at node 88 is a combination of the output values of comparator 78 and comparator 118. In this manner, the differentiating circuit 72, made up of acceleration circuit 74 and deceleration circuit 76, provides an engine quality signal at node 88 when the engine speed is both increasing and decreasing.

The engine quality signal at node 88 consists of a series of voltage spikes having a magnitude representing the rate of change of the engine speed signal present at node 62. Since the engine quality signal at node 88 is a series of spikes which are difficult to read and interpret, the engine quality signal at node 88 is further conditioned by an output circuit 128. The output circuit 128 integrates the engine quality signal at node 88 to produce an output signal at node 138. The output circuit 128 is a three-node filter consisting of resistor 132, capacitor 134, resistor 136, capacitor 138, resistor 140, and capacitor 142. The three-node filter contained in the output circuit 128 is a fast settling time integrator, similar to the integrating circuit 48, such that changes in the engine quality signal at node 88 will be reflected rather quickly by a change in the voltage across capacitor 142. The output signal represented by the voltage across capacitor 142 is the summation of the engine quality signal for a period of time and will thus increase based on the number and the magnitude of the spikes in the engine quality signal. Since more voltage spikes are present in the engine quality signal when the engine is operating roughly, the output signal increases as the engine running quality worsens. The output signal present at node 130 is a relative value, such that as the output signal at node 130 increases, the increasing value indicates that the engine running quality is deteriorating. Thus, to optimize engine performance, the value of the output signal at node 130 should be reduced to as low a value as possible.

The output signal at node 130, represented by the voltage across capacitor 142, is input into a visual output device 144. The visual output device 144 provides a visual indication of the relative value of the output signal at node 130. In the preferred embodiment of the invention, the visual output device 144 is a digital volt meter, such that as the reading on the digital volt meter increases, the technician understands that the engine running quality is deteriorating. The visual output device 144 is connected through switch 146 to a power supply 148. In the preferred embodiment of the invention, the power supply 148 is a 9 volt DC battery. Although the visual output device 144 has been described as being a digital volt meter, it is understood that other types of volt meters, such as an analog volt meter, could be substituted while operating under the scope of the invention.

OPERATION

In the preferred embodiment of the invention, the running quality evaluator 10 of the invention is a self-contained unit having leads which can be connected to the internal combustion engine being tested. The first step in analyzing the running quality of an internal combustion engine is to connect node 12 to the tachometer of the internal combustion engine. Once the tachometer is connected to node 12, a series of trigger pulses from the tachometer are fed into timer 26 through transistor 20. Timer 26 generates a series of conditioned trigger pulses having a constant pulse width determined by resistor 34 and capacitor 36.

The series of conditioned trigger pulses are then integrated by integrating circuit 48 to provide a DC engine speed signal at node 62. The engine speed signal at node 62 changes as the frequency of the trigger pulses from the internal combustion engine change. Thus, the greater the rate of change of the engine speed signal at node 62, the worse the running quality of the internal combustion engine.

The engine speed signal at node 62 is then fed into a differentiating circuit 72. The differentiating circuit 72 produces an engine quality signal related to the rate of change of the engine speed signal. Since the engine speed could be either increasing or decreasing, the differentiating circuit 72 includes both an acceleration circuit 74 and a deceleration circuit 76. The acceleration circuit 74 and deceleration circuit 76 combine to produce the engine quality signal which increases as the rate of change of the engine speed signal increases, thus indicating poor operating conditions.

The engine quality signal at node 88 is integrated through an output circuit 128 such that an output signal voltage is present at node 130. The larger the output signal at node 130, the poorer the engine running quality, since the engine speed is oscillating and causing the output signal to increase. The output signal is fed into a visual output device 144, such that a technician can monitor the relative running quality of the engine.

To adjust the running quality, the technician watches the visual output device 144 while changing the spark plug timing. For instance, if the visual output device 144 reads 60 millivolts, and the technician retards the spark timing by 1°, thereby causing the output at visual output device 144 to increase to 70 millivolts, this increase in the output signal indicates that the running quality of the engine has worsened. Thus, the technician returns the spark timing to the previous position to improve the engine performance. Likewise, if retarding the spark timing by 1° decreases the output of the usual output device 144 by 70 millivolts, the technician knows he has improved the engine performance. In this manner, the technician is able to monitor the visual output device 144 while adjusting the spark timing until the output of the visual output device 144 has been minimized. When the value of the visual output device 144 is minimized, the internal combustion engine has reached its optimal running quality.

The analysis of the engine running quality previously discussed can be performed at idle or at some other engine operating speed, such as 3500 RPM for example. The running quality evaluator 10 can be used on two-cycle or four-cycle engines having various types of fuel injection.

While the invention has been described as being a self-contained unit, it is contemplated that the circuit shown in FIG. 1 could be incorporated into the electronic control unit located on board a boat or a vehicle. Thus, the electronic control unit of the vehicle could modify the spark timing periodically based on the concept of minimizing the output signal found at node 130. In this manner, the running quality evaluator 10 provides a usable signal related to the running quality of an internal combustion engine. Thus, a technician attempting to optimize performance of an internal combustion engine no longer has to rely on visual and audio perception to modify engine performance.

I claim:

1. A running quality evaluator for quantifying the quality of operation of an internal combustion engine, the evaluator comprising:

an engine speed circuit connectable to the internal combustion engine for conditioning a series of trigger pulses from the engine, wherein the frequency of the trigger pulses correspond to the engine speed;

an integrating circuit coupled to the engine speed circuit for converting the conditioned trigger pulses into an engine speed signal, wherein the engine speed signal increases as the frequency of trigger pulses increases;

a differentiating circuit coupled to the integrating circuit, the differentiating circuit converting the engine speed signal into an engine quality signal, wherein the engine quality signal increases as the rate of change of the engine speed signal increases; and an output circuit coupled to the differentiating circuit for converting the engine quality signal into an output signal representative of the quality of operation of the engine, wherein the output signal increases as the engine quality signal increases.

2. The running quality evaluator of claim 1 wherein the engine speed circuit includes a timer, the timer conditioning the series of trigger pulses from the engine into a series of conditioned trigger pulses each having a constant pulse width.

3. The running quality evaluator of claim 1 wherein the output circuit includes a visual output device, the visual output device displaying the value of the output signal.

4. The running quality evaluator of claim 3 wherein the visual output device is a digital volt meter.

5. The running quality evaluator of claim 1 wherein the differentiating circuit includes an acceleration circuit and a deceleration circuit, the acceleration circuit converting the engine speed signal into the engine quality signal when the engine speed signal is increasing and the deceleration circuit converting the engine speed signal into the engine quality signal when the engine speed signal is decreasing.

6. The running quality evaluator of claim 5 wherein the deceleration circuit includes an inverting amplifier to invert the engine speed signal when the engine speed signal is decreasing.

7. A running quality evaluator for quantifying the quality of operation of an internal combustion engine, the evaluator comprising:

an integrating circuit for integrating a series of trigger pulses from the engine into an engine speed signal, wherein the engine speed signal increases as the frequency of the trigger pulses increases;

a differentiating circuit coupled to the integrating circuit, the differentiating circuit converting the engine speed signal into an engine quality signal, wherein the engine quality signal increases as the rate of change of the engine speed signal increases; and an output circuit coupled to the differentiating circuit for converting the engine quality signal into an output signal representative of the quality of operation of the engine, wherein the output signal increases as the engine quality signal increases.

8. The running quality evaluator of claim 7 further comprising a visual output device coupled to the output circuit, the visual output device displaying the value of the output signal such that the output signal can be minimized to improve the quality of operation of the engine.

9. The running quality evaluator of claim 8 wherein the visual output device is a digital volt meter.

10. A running quality evaluator for quantifying the quality of operation of an internal combustion engine, the evaluator comprising:

an engine speed circuit having a timer, the engine speed circuit being connectable to the engine to receive a series of trigger pulses from the engine and generate a series of conditioned trigger pulses, each conditioned trigger pulse having a constant pulse width controlled by the timer;

an integrating circuit including a three node filter coupled to the engine speed circuit for converting the conditioned trigger pulses into an engine speed signal, wherein the engine speed signal increases as the frequency of the conditioned trigger pulses increases;

a differentiating circuit, including an acceleration circuit and a deceleration circuit, coupled to the integrating circuit, the acceleration circuit converting the engine speed signal into an engine quality signal when the engine speed signal is increasing and the deceleration circuit converting the engine speed signal into the engine quality signal when the engine speed signal is decreasing;

an output circuit including a three node filter coupled to the differentiating circuit for converting the engine quality signal into an output signal representative of the quality of operation of the engine, wherein the output signal increases as the engine quality signal increases; and a visual output device coupled to the output circuit to visually display the value of the output signal such that the output signal can be minimized to increase the running quality of the engine.

11. A method of evaluating the running quality of an internal combustion engine, the method comprising the steps of:

integrating a series of trigger pulses from the engine to generate an engine speed signal, the engine speed signal increasing as the frequency of the trigger pulses increases;

differentiating the engine speed signal to generate an engine quality signal, the engine quality signal increasing as the rate of change of the engine speed signal increases; and integrating the engine quality signal to generate an output signal, the output signal increasing as the engine quality signal increases, whereby the output signal represents the quality of operation of the engine.

12. The method of claim 11 further comprising the step of conditioning the series of trigger pulses from the engine such that the series of conditioned trigger pulses have a constant pulse width and a frequency corresponding to the speed of the engine.

13. The method of claim 11 wherein the step of differentiating the engine speed signal includes providing an acceleration circuit and a deceleration circuit such that the acceleration circuit differentiates the engine speed signal while the engine speed signal is increasing and the decelerating circuit differentiates the engine speed signal when the engine speed signal is decreasing.

14. The method of claim 11 further comprising the step of:

displaying the output signal on a visual display device; and monitoring the output signal while adjusting the engine timing, such that the internal combustion engine can be optimized by minimizing the value of the output signal.

15. A method of evaluating the running quality of an internal combustion engine, the method comprising the steps of:

generating an engine speed signal based on the speed of the internal combustion engine, the engine speed signal changing as the speed of the engine changes;

generating an output signal related to the rate of change of the engine speed signal; and visually displaying the output signal such that the operation of the internal combustion engine can be optimized by minimizing the value of the output signal, wherein the step of generating an output signal includes differentiating the engine speed signal to generate an engine quality signal, the engine quality signal increasing as the rate of change of the engine speed signal increases; and integrating the engine quality signal to generate an output signal, the output signal increasing as the engine quality signal increases, whereby the output signal represents the quality of operation of the engine.

16. The method of claim 15 wherein the step of differentiating the engine speed signal includes providing an acceleration circuit and a deceleration circuit such that the acceleration circuit differentiates the engine speed signal when the engine speed signal is increasing and the deceleration circuit differentiates the engine speed signal when the engine speed signal is decreasing.

* * * * *